(12) United States Patent
Hart et al.

(10) Patent No.: US 7,397,014 B2
(45) Date of Patent: Jul. 8, 2008

(54) PORTABLE LASER APPARATUS FOR MARKING AN OBJECT

(75) Inventors: Geoffrey F. Hart, Kent (GB); John T. Bell, Kent (GB)

(73) Assignee: Retainagroup Limited, London (GB)

( * ) Notice: Subject to any disclaimer, the term of this patent is extended or adjusted under 35 U.S.C. 154(b) by 0 days.

(21) Appl. No.: 10/583,475

(22) PCT Filed: Dec. 17, 2004

(86) PCT No.: PCT/GB2004/005319

§ 371 (c)(1),
(2), (4) Date: Jan. 9, 2007

(87) PCT Pub. No.: WO2005/058536

PCT Pub. Date: Jun. 30, 2005

(65) Prior Publication Data
US 2007/0131663 A1    Jun. 14, 2007

(30) Foreign Application Priority Data
Dec. 18, 2003  (GB) ................... 0329334.7
Mar. 30, 2004  (GB) ................... 0407151.0

(51) Int. Cl.
*B23K 26/00* (2006.01)
(52) U.S. Cl. ................. 219/121.68; 219/121.6
(58) Field of Classification Search ............ 219/121.68, 219/121.6, 121.78, 121.69, 121.74
See application file for complete search history.

(56) References Cited

U.S. PATENT DOCUMENTS

| 4,017,168 | A |   | 4/1977  | Brown |
| 4,037,763 | A |   | 7/1977  | Turchen |
| 4,473,074 | A | * | 9/1984  | Vassiliadis ............. 219/121.74 |
| 5,298,717 | A |   | 3/1994  | DeRossett, Jr. |
| 5,653,900 | A | * | 8/1997  | Clement et al. ........ 219/121.68 |
| 5,963,749 | A |   | 10/1999 | Nicholson |
| 6,114,651 | A | * | 9/2000  | Schluter et al. ........ 219/121.69 |
| 6,362,451 | B1 |  | 3/2002  | Karni et al. |
| 6,700,094 | B1 | * | 3/2004  | Kuntze ................... 219/121.68 |
| 2002/0167974 | A1 | * | 11/2002 | Kennedy et al. ............... 372/10 |
| 2002/0198622 | A1 | * | 12/2002 | Dinauer et al. ......... 219/121.69 |
| 2003/0226835 | A1 |   | 12/2003 | Bell et al. |

FOREIGN PATENT DOCUMENTS

| DE | 37 08 577 | 9/1988 |
| DE | 44 06 969 | 9/1994 |
| DE | 100 59 246 | 6/2002 |
| EP | 1 057 578 | 12/2000 |
| WO | WO 95/06539 | 3/1995 |
| WO | WO 98/34789 | 8/1998 |
| WO | WO 00/13837 | 3/2000 |
| WO | WO 01/007197 | 2/2001 |
| WO | WO-02/38319 A2 * | 5/2002 |

* cited by examiner

*Primary Examiner*—Geoffrey S Evans
(74) *Attorney, Agent, or Firm*—Dickstein Shapiro LLP (57) ABSTRACT

The present invention relates to an apparatus and a method for marking an object, particularly a vehicle, by disrupting the material of the interior or surface of the object. The system comprises a laser emitter (102), a laser beam delivery means (104) which can be flexible, and a marking heading (105) which is light enough to be carried by an operator. The laser marking system is very flexible in use, allowing many parts of objects, particularly vehicles, to be marked.

13 Claims, 3 Drawing Sheets

PORTABLE LASER APPARATUS FOR MARKING AN OBJECT

The present invention relates to an apparatus and a method for marking an object, particularly a vehicle.

Vehicle marking is particularly important as a method of discouraging theft of vehicles. If at least one indelible mark is applied to a part of the vehicle, it will be difficult for thieves to disguise the identity of the stolen vehicle when they try to sell it. Indelible marks can be applied to secret or enclosed spaces within the structure. However, such marks have the disadvantage that they are not readily viewable by purchasers. A highly visible indelible mark is required to deter theft.

Accordingly, a practice has arisen of applying marks so that they will be readily visible from an outer surface of a vehicle. These marks should be formed by disrupting the material of the interior or surface of a part of the vehicle that is visible from the outside, to provide an adequately permanent mark that cannot be easily removed. These marks may be made in any suitable part of the structure, however, it is particularly preferred to make the marks in the windows of the vehicle. It is usually not possible to remove a mark from window glass. The windows of the vehicle cannot be covered up or painted over by a thief to disguise the identity of the vehicle. It is impossible remove an etched mark from window glass without either repolishing the entire surface or, leaving a clear indication that the glass has been tampered with. Repolishing the glass would require removal of the glass from the vehicle.

It is well known in the art to apply a mark to the window glass of a vehicle by a chemical etching process. Typically, a stencil is used defining a unique code which allows the vehicle to be identified, an etching material being applied through the stencil to the window glass. Typically, the etching material comprises hydrogen fluoride or related materials. However, these are very dangerous materials to handle and the process is extremely difficult to automate.

A system of making marks in glass using a laser has been proposed, for example in U.S. Pat. No. 5,298,717. In this case, a carbon dioxide laser is used which generates a laser beam which will make a mark on the surface of glass. The system further includes a controller for providing signals for controlling the laser beam and a laser beam steering system comprising a pair of mirrors whose axes are orthogonal. In use, the laser beam impinges first on one mirror and then on the second mirror, the angular positions of the mirrors being altered in response to signals from the system controller to move the position of the laser beam and thereby cut a suitable pattern onto the glass. In one embodiment, the laser is suspended by a flexible mounting from a gantry which is located above a vehicle station. In another embodiment, the laser itself is mounted on the gantry, a flexible arm being provided, down which the laser beam may be directed to a marking head which contains the mirrors for deflecting the laser beam in the required pattern. The laser emitter mounted on the gantry can be displaced from front to rear of the vehicle as required by the operator.

This system however is very large and bulky. It is primarily designed to operate within a flow of vehicles in a factory.

If a vehicle is incorrectly marked, or damaged in such a way that it has to be marked again or taken out of order in the flow of vehicles, it is extremely difficult to readjust the system, requiring substantial down-time.

There are many parts of the vehicle which cannot be marked by the apparatus of U.S. Pat. No. 5,298,797, because the arm on which the laser marking apparatus is mounted cannot reach them.

The present inventors have realised that a flexible and light system can be provided if the laser emitter and the marking head are both movable and if the marking head at least can be carried by the user. In this way, the combination of marking head and laser emitter can be taken to any part of the vehicle. The apparatus can be used to mark any part of the vehicle when the vehicle is in a marking station. Alternatively, the apparatus may be taken to a vehicle which is in another place in the vehicle flow in a factory so that the vehicle can be marked out of turn without returning the vehicle to the marking station.

In particular, the inventor has realised that marking heads and laser emitters can now be manufactured at a sufficiently light weight to that they can be transported and operated by a single operator in a way which is very flexible.

The present inventor has further realised that a laser beam suitable for marking the interior or surface of an object, such as an exterior structure of a vehicle, can be generated in a movable laser beam emitter and delivered to a marking head which is movable with the respect to the laser beam emitter, being to delivered via a fibre optic cable for transmission of the laser beam. This allows the laser marking system to be particularly flexible in application.

The present inventor has further realised that the apparatus may comprise a harness which is worn by a user, for supporting the weight of at least the marking head and preferably the marking head and the laser emitter so that the weight actually carried by the user in the hand is very small. In particular, the present inventor has realised that apparatus used for carrying cameras such as a STEADICAM (trade mark) maybe used to support at least the marking head, preferably the laser emitter and marking head, in a manner which makes it very easy for a user to operate in an accurate fashion.

Accordingly, the present invention provides a laser marking system for marking an object by disrupting the material of the interior or surface of the object, the system comprising a marking head, comprising means for directing a laser beam to define a pattern, a laser emitter, and laser beam delivery means for delivering the laser beam from a laser emitter to the marking head, wherein the marking head and the laser emitter are movable and at least the laser marking head is configured to be carried by a person.

The present invention further provides a method for marking an object by disrupting the material of the interior or surface of the object using a laser, comprising using the laser marking system of the invention.

The Laser Marking Apparatus—Key Features

A laser marking apparatus according to the present invention must comprise:

A marking head

A laser emitter

A laser beam delivery means

At least the marking head and preferably both the marking head and laser emitter are configured to be portable.

The laser marking apparatus of the present invention preferably includes the following features for improving the operation:

1. a controller for controlling the emission of the laser beam and a pattern formed by the marking head, 2. input means, for inputting data to allow an operator to control the laser apparatus.

These features will be discussed below.

Portable Configuration

At least the marking head of the laser marking apparatus of the invention is configured to be carried by one person.

This means that the operator carries the whole weight of the marking head. The marking head need not be supported in use by any other structure, for example, by a gantry as in U.S. Pat. No. 5,298,717 and EP application no. 02251416.0. The operator carries the marking head at least when the laser marking apparatus is ready to form a mark and while it is forming a mark. In a preferred embodiment, the marking head may have a storage position in which its weight is carried by storage means, but the operator carries the whole weight of the marking head substantially the whole time the laser marking system is being operated.

In a preferred embodiment, the present invention provides a laser marking facility comprising a storage station for storing the laser marking apparatus and a marking zone, comprising a zone where the laser marking apparatus may be used to mark an object. Preferably, the laser marking zone is displaced from the storage position. The laser marking zone may comprise a very large area extending for at least 10 metres and preferably at least 20 metres from the storage zone.

In order to allow the marking head to be carried by the operator, there is preferably at least one handle, the whole weight of the marking head being carried through the at least one handle.

By allowing that at least the marking head may be carried by the operator, the position of the marking head becomes very much more freely controllable, allowing the operator to move around with the marking head over a very large distance and to a large number of positions.

In a first embodiment, the laser emitter is not carried by the operator. The laser emitter may be substantially fixed in position however. However, in a preferred embodiment, the laser emitter itself is movable. Where the laser emitter is movable, it need not be configured so that it may be carried by the operator. The weight of the emitter may be taken by support means which allow movement, for example wheels, slides, a gantry and suspension means, cables etc. Such means for supporting weight of the laser emitter are typically such that the degree of movement afforded to the laser emitter is smaller than the degree of movement available to the marking head, however the degree of movement available for the whole apparatus is substantially greater than conventional apparatus using a fixed gantry.

For example, an operator can move the laser marking apparatus from a storage position to a position close to an object to be marked until the emitter is as close as the emitter support means will allow and then access whatever part of the object needs to be marked using the marking head.

In the first embodiment, the laser beam delivery means is preferably flexible.

That is, the laser beam delivery means preferably allows the marking head to be displaced with respect to the laser emitter in at least two dimensions and preferably in the least three dimensions. Preferably, the laser beam delivery means allows the direction in which the marking head faces to move with respect to the laser emitter in two angular dimensions.

The laser beam delivery means will be further described below.

In a second embodiment, the laser emitter is carried by the operator as well as the marking head. The laser emitter and the marking head may be fixed with respect of one another. In this case, the laser beam delivery means is rigidly fixed to the laser emitter and marking head and may comprise a simple laser aperture.

Designs of laser beam delivery means which allow this are described below.

Where the marking head comprises at least one handle, the handle may be sufficient for carrying both the marking head and the laser emitter.

Alternatively, the laser emitter may be carried by at least one separate handle. Yet again, the laser emitter may be carried by a personal load carrying system, for example being mounted on a belt, shoulder strap, yoke or other pack or garment. Suitably, the personal load carrying system carries the weight of the laser emitter while leaving the operator's hands free to carry or operate the marking head.

In a particularly preferred embodiment, the emitter is carried on a personal load carrying system which is rigidly mountable on a user's body, the marking head being mounted on a support arm which allows the marking head to be moved with respect to the personal load carrying system while transferring the weight of the marking head to the personal load transfer carrying system so that the operator carries the whole apparatus through the personal load carrying system while having their hands free to operate the marking head in a very easy controlled manner. For example, the personal load carrying system may be based upon the vest employed in the STEADICAM (trademark) camera carrying system.

Laser Emitter

The type of laser chosen will depend upon the object being marked.

The present invention is particularly suitable the making security marks on vehicles. In order to mark windows of a vehicle, the surface of the glass itself may be marked or, alternatively, the organic inter layer formed between sheets of laminated glass may be marked.

In the first process, a laser beam must be used which is strongly absorbed by glass. It is found that the laser beam emitted by a carbon dioxide gas laser (having a wavelength of 10.6 micrometres) or an excimer laser is suitable for this purpose.

For the second approach, a laser beam may be used which is not absorbed by glass but is absorbed by the organic interlayer. In this case, it is found that the beam generated by a neodymium/YAG laser may be used.

It has been found that, in order to avoid cracking the glass and in order to provide a mark which has clearly defined edges, a pulsed laser is suitably used. The frequency of pulsing is suitably in the range 10-100 kHz, more preferably 30-60 kHz, most preferably 35-45 kHz.

The average power of the laser is suitably in the range 5-20 watts.

Further comments on the parameters of the laser operation are given below in the section headed "marking parameters".

The carbon dioxide laser may be a high frequency excited carbon dioxide laser, preferably excited at a frequency in the range 10-50 MHz. A radio frequency excited carbon dioxide laser may be used. A slab laser may be used.

Suitable radio frequency excited carbon dioxide slab lasers are manufactured for example by the company Rofin Sinar UK Ltd.

The laser used in the present invention may also be used to mark other parts of the vehicle than the windows, including headlights, plastic parts, painted body work or alloy wheels trims.

The present inventors have discovered that conventional radio frequency excited carbon dioxide lasers have the problem that they can be very heavy. This is particularly the case where a supply of radio frequency for exciting the carbon dioxide laser has to be used.

In an alternative embodiment, a carbon dioxide laser is used which is pulsed by the use of a Q-switch. The Q-switch may be internal to the laser emitter or external to the laser emitter. A Q-switch in the optical path provides laser pulses of extreme short time duration. The Q-switch may be a rotating prism, a Pockels cell or a shutter device to create a pulse.

The use of a carbon dioxide laser with a Q-switch has been found to be particularly valuable because it allows a relatively light weight emitter to be used without requiring a heavy and complex source of radio frequency to excite the laser.

Suitable forms of light weight carbon dioxide laser include the SYNRAD ™ Series 48 lasers or a carbon dioxide laser with an integral Q-switch available from DEMARIA Electro Optic Systems. WO02/082600 discloses a Q-switch cavity dumped carbon dioxide laser for material processing which is suitable for use with the invention.

The laser output may be steady, as in a continuous wave laser or pulsed.

It is desirable that the laser emitter is light weight. This allows the laser to be portable and preferably allows the laser to be carried by the operator. For example, the maximum weight of the laser emitter should not exceed 30 kilograms, being preferably 20 kilograms or less and suitably 10 kilograms or less.

The laser emitter will require a source of electrical power to drive it. This may be provided by a battery pack which is mounted with the laser on a portable mounting or carried by the operator or mounted on a separate unit which supplies power to the system via a cable. The separate unit may comprise a wheeled unit such a s a trolley. An inverter may be used to convert the DC electrical supply from the batteries to an AC power supply. A removable battery pack may be used. A recharging device may be provided for battery packs. A first battery pack may be recharged while a second battery pack which has been charged is used to supply power.

However, such battery packs are relatively heavy and bulky. Accordingly, in an alternative embodiment, the laser emitter is supplied with electrical power by a current carrying cable or lead. Any conventional type of electrical current carrying cable can be used. At one end, the cable is connected to the laser emitter and at the other end, it is connected to a source of electrical power in a manner which is known in the art, for example a generator or mains power supply. A cable of the type used for carrying electrical power to drills or other portable apparatus is suitable for use in the present invention.

The emitter may be mounted on a pack to be carried by the operator, on a hand held unit to be carried by an operator or on a marking vehicle which can be propelled to where the operator requires it. When mounted on such a vehicle, the emitter may be located inside a body of the emitter. It may be rotatably mounted on the vehicle, so that the emitter can be turned to face a vehicle to be marked without moving the marking vehicle.

Marking Head

In the marking apparatus of the invention, the laser emitter produces a pulsed or continuous laser beam which is delivered via delivery means to the marking head.

The marking head is adapted to contact the part of the object to be marked, and deliver the laser beam to the part of the object to marked, the marking head further including means for deflecting the laser beam to define a pattern required to form the mark.

The mark formed may be of any suitable type, for example an alpha numeric code of specified number of characters in a specified number of rows. Alternatively, it may comprise a graphic symbol, logo or other mark. In all cases, it is necessary to move the laser beam across the surface of the part of the object to be marked in two dimensions. The mark may be formed in a dot matrix pattern by scanning the laser beam across the surface of the part of object to be marked in a rasterscan pattern. Alternatively, the characters can be scribed individually.

In order to deflect the laser beam in two dimensions, any suitable system may be used. However, preferably at least one mirror is provided which is rotatable about at least one axis to deflect the laser beam. Preferably, a pair of mirrors in sequence are used, each intersecting the laser beam and each being rotatable about a respective fixed axis. Preferably the axes about which the mirrors are rotatable are orthogonal to one another. The rotation of the mirrors is controlled by any suitable means. Preferably, the rotation of the mirrors is controlled by galvanometers which are found to move quickly and effectively. A suitable arrangement is described for example in U.S. Pat. No 5,298,717.

The marking head will further comprise a light-tight casing for presenting leakage of laser radiation, to protect operators.

A part of the casing will comprise a window of a material which is transparent to the laser radiation used. For example, where a carbon dioxide laser is used (as discussed further below), the window may comprise germanium.

The marking head will suitably comprise control means operable by the operator.

The control means suitably include means for commencing laser marking when the marking head is in position.

The control means preferably includes a safety device. The safety device suitably comprises at least one switch which is only closed when the marking head is in the correct position on a part of the object to be marked, in order to prevent the apparatus being accidentally fired. Preferably, there are at least three switches, all of which have to be depressed when the marking head is in correct position, the laser being inoperable until all three switches are depressed. This ensures that the marking head is in position before the laser is fired to prevent distortion of the mark applied and to prevent escape of laser radiation.

The marking head may further comprise a resilient seal around the marking head to further prevent leakage of radiation.

Means may be provided for cleaning the laser beam window to prevent loss of light or focus. For example, an air jet may be provided for blowing deposits off the laser beam window and to prevent contamination of lenses.

Preferably, means are provided for collecting material released during the marking of the window glass. For example, glass dust may be collected. The collecting means may comprise a simple container. However, in order to catch the relatively light particles of glass, an adhesive surface may be provided. For example, a piece of double sided adhesive tape may be employed.

Preferably, the marking head is of light weight. Preferably, the weight of the marking head does not exceed 5 kg, being preferably less than 3 kg suitably less than 2 kg. A suitable design of marking head is the HS7 available from Scanlab ™. Other suitable marking heads can be obtained from the manufacturer Rofin Sinar.

The marking head will require a supply of electrical power to drive it. The electrical power may be provided by a battery pack. The battery pack may be carried by the user or mounted for example with the laser emitter. However, the power is suitably provided by a cable connected to a stationary power supply as disclosed for the laser emitter described above.

Marking Parameters

When making a mark using the laser, it is necessary to deliver sufficient power to the surface being marked to disrupt it to form a mark without causing unnecessary damage. For example, where glass, for example window glass in a vehicle, it is to be marked, it is desirable to form a mark without cracking the glass.

The quality of the mark is affected by the ratio of time that the laser beam is switched on to the time the laser beam is switched off, called the duty ratio. Suitably, the duty ratio is in the range 20%-60% on, more preferably 30-50% or most preferably 35-45% on. For example, at 40 kHz, a 40% duty on ratio in the duty cycle will give a 10 millisecond burst of laser radiation followed by 15 milliseconds in which the laser is switched off.

The scanning speed also affects the quality of the mark. Preferably, the scanning speed is in the range 2000-8000, more preferably 3000-6000, most preferably 4000-5000 mm/s.

It is particularly preferred to match the duty cycle to the scanning speed and the average operating power of the laser. In particular, it is particularly preferred to operate within the parameters 5-20 watts, with a duty cycle in the range 30-50% and a scanning speed in the range 3000-6000 mm per second, more preferably operating at a power in the range 10-15 watts, with a duty cycle in the range 35-45% and the scanning speed in the range 4000-5000 mm/s These figures may be represented by a notional value of energy input per unit length. For example, when operating at 10 watts with a 40% duty cycle and a scanning rate of 4,500 mm per second, the energy per unit length is 10 0.4/4500 =approx. 0.9 joules per mm. Preferably, to avoid cracking and to obtain a mark which is clearly defined, the energy per unit length is in the range 0.5-2.0 joules per mm, more preferably 0.75-1.2 joules per mm more preferably 0.8-1.0 joules per mm.

It has been found that, in order to mark window glass of vehicles, it is particularly preferred to use a carbon dioxide laser operating in the range 5-20 watts, more preferably around 10-15 watts.

Laser Beam Delivery Means

Where the laser emitter and the marking head are fixed in relation to one another, a simple rigid laser beam delivery means may be used.

However if the marking head is movable with respect to the laser emitter, a flexible laser beam delivery means is required.

As noted above, the flexible laser beam delivery means preferably allows the marking head to move in at least two and preferably three linear dimensions and preferably two angular dimensions.

The laser beam delivery means suitably comprises a plurality of laser beam conduit sections placed in sequence one after the other, each laser beam delivery conduit section being displaceable with respect to the adjacent laser beam conduit section around at least one and preferably two axes. Preferably, there are at least three conduit sections. Preferably, to give a very high degree of flexibility, there are at least ten laser beam conduit sections.

The joints between laser beam conduit sections may comprise tuning mirrors for ensuring that the laser beam is directed down the central axis of the laser beam conduit section to the next joint.

In an alternative embodiment, the laser beam delivery means comprises a flexible fibreoptic cable. This gives a high degree of flexibility.

Laser beam conduit sections may be rotatably mounted with respect to one another. They may be telescopically mounted with respect to one another.

A suitable design of laser beam conducing fibreoptic cable is available from Oxford Electronics Ltd.

In order to prevent damage to the laser beam delivery means and to prevent or reduce loss of power, the laser beam delivery means is preferably no longer in total than 2.0 metres, being preferably no more than 1.5 metres in length.

Where a fibreoptic cable is used, the cable may be relatively long, for example in the range 2 to 10 metres, preferably 3 to 7 metres, and most preferably around 5 metres.

Where a fibreoptic cable is used, a protective casing may be used. The protective casing is provided to prevent accidental damage to the fibreoptic cable. The protective casing may also be relatively stiff to prevent the fibreoptic cable being bent to a radius of curvature which is too small. For example, the casing may only permit the fibreoptic cable to be bent to a radius of curvature of 5.0 cm or more, preferably 10.0 cm or more.

Controller and Input

In order to control the operation of the laser emitter and the marking head to produce a required mark, a controller is required. Data may be input to the controller by input means.

Where the mark to be made on the object comprises a character as described above, it is necessary to deflect the beam in at least two directions and to switch the beam on and off whilst forming the characters. Preferably, at least one of the position of the beam and the duration of the beam, preferably both, are controlled by a controller. The controller may be mounted in the marking head, in the laser apparatus or at another position on the apparatus of the invention.

Where security codes are to be marked onto object, it is generally necessary for at least one component of each code to be unique to the vehicle which is being marked. Accordingly, input means may be provided for inputting to the controller the code required for each vehicle. The code may be input manually, for example using a keyboard. Alternatively, the code may be transmitted to the controller via a communications network such as the Internet or by dedicated communication lines such as telephone lines. Alternatively, the controller may be provided with a scanner for reading information relating to the code to be marked on each vehicle. For example, the scanner may comprise a bar code reader of the sort well known in the art.

The controller suitably comprises a personal computer or a similar computer programmed to control the apparatus.

For example, the controller may comprise a processor connected to at least one memory, the memory being for storing data comprising, for each vehicle to be marked, vehicle marking data (for example the vehicle identification number), the code to be marked on the vehicle and the date on which the mark is made. Preferably, an input is provided for inputting to the processor the vehicle data, the processor being adapted to enter the vehicle data into the memory.

The processor is preferably further connected to a laser controller. In order to mark a given vehicle, its Vehicle Identification Number, which is a unique number assigned to that vehicle by an international organisation, is input to the processor. The processor then extracts from the memory code data required to be marked on the vehicle. The code data is then transferred to the laser controller. The laser controller itself is connected to the laser and, separately, to the marking head. The laser controller controls the laser by switching it on and off, in co-ordination with the movement of the laser beam by the laser marking head so that the required code is marked onto the vehicle. Once the vehicle has been marked the required number or times, a signal can be input to the processor to indicate that the vehicle has been marked. The processor then writes the confirmation of marking and the date of marking into a second memory.

The processor is preferably configured to delete the marking data from a memory to prevent the same mark being applied to a second vehicle. The marking data may be entered into the second memory to provide a record.

The apparatus of the invention may be used to mark any suitable part of a vehicle. However, it is particularly preferred to use the apparatus of the invention to mark at least one window of the vehicle.

The controller preferably further comprises a signal cable for transmitting control signals to the laser emitter and the marking head. Where the laser emitter is connected to the marking head by a flexible laser beam delivery means, a signal cable for the marking head suitably passes along the laser beam delivery means. For example, they may lie side by side. The signal cable may be formed integrally with the structure of the laser beam conduit means.

The controller may be portable, for example being mounted on a portable structure with the laser emitter. Alternatively, the controller may be fixed, being connected to the laser emitter and the marking head by a signal cable. For example, the signal cable may extend coaxially with a power cable for transmitting power to the laser emitter and marking head.

The present invention will be described further below with reference to the accompanying drawings, in which.

BRIEF DESCRIPTION OF THE DRAWINGS

DETAILED DESCRIPTION OF THE DRAWINGS

Figure 1:
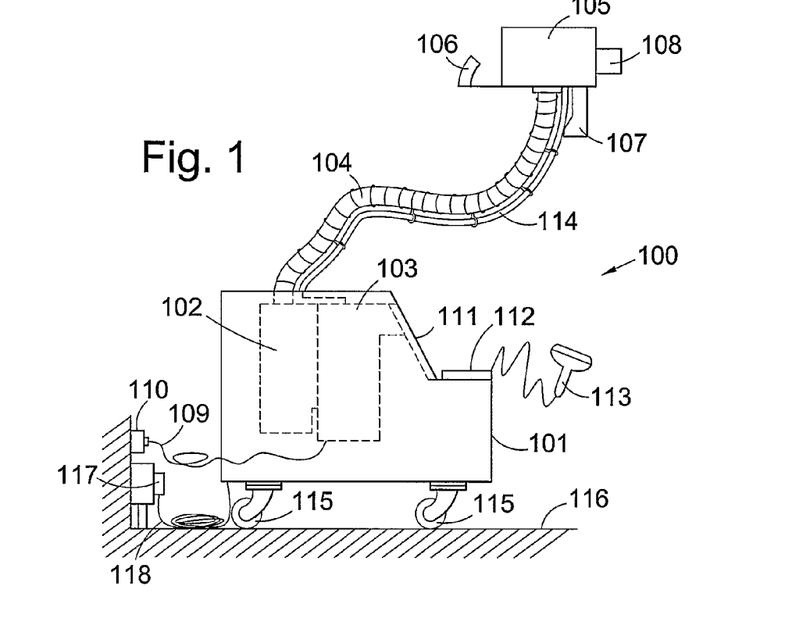
FIG. 1 is schematic view of a first embodiment of apparatus according to the invention.

FIG. 1 is a schematic view of a first embodiment of a laser marking apparatus according to the invention.

The laser marking apparatus in FIG. 1 is intended for use in marking the window glass of motor vehicles with security codes, to deter theft of the vehicles.

The apparatus 100 comprises a mobile unit 101 which contains a laser emitter 102 and a laser controller 103.

The laser emitter 102 is for emitting a laser beam which is transmitted via a flexible laser beam delivery means 104 to a hand held marking head 105.

The hand held marking head 105 is designed so that it can be carried with the whole weight of the marking head supported by the user without any other support. The weight of the marking head does not exceed 10 kgs and is preferably less than 5 kgs.

The marking head 105 further comprises a trigger assembly 106 and a main handle 107 whereby the user may take the whole weight of the marking head 105. By holding the handle 107 in one hand and the trigger assembly 106 in the other, the operator has complete control of the position and orientation of the marking head.

An aperture assembly 108 is provided for contacting the window glass of the vehicle for forming a mark, as will be described further below.

The laser emitter 102 comprises a carbon dioxide laser supplied by DEOS, including an integral Q-switch for delivering a pulsed laser beam, as will be described further below. The laser controller 103 is further connected by a length of flexible cable 109 to a telecommunications socket 110 for exchange of data. A flat screen display 111 is provided so that a user can monitor data means input and output by the unit 100. A key pad 112 and a barcode reader 113 are provided.

The laser controller 103 is further connected by a flexible cable 114 which is coaxially mounted with the laser beam delivery means 104 to the marking head 105. The unit 101 is mounted on castor wheels 115 so that it may be moved around a factory floor 116 to a suitable position to allow the operator to use the apparatus.

The unit may comprise a drive for driving the unit around a factory floor.

The entire apparatus is supplied with power from a socket 117 via a flexible length of cable 118.

The method of use of the apparatus of FIG. 1 will be described further below.

Figure 2:
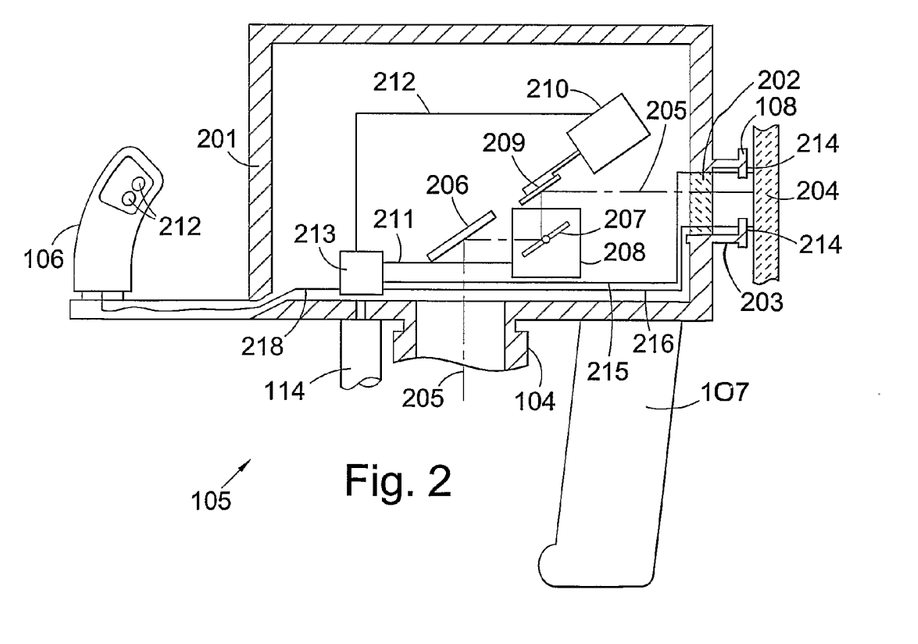
FIG. 2 is a part cross sectional view, at enlarged scale, of the marking head of FIG. 1.

FIG. 2 is a sketch partial cross section through the laser marking head 105, at enlarged scale compared to FIG. 1.

The marking head 105 includes a casing 201 connected at the bottom to the laser beam delivery means 104 by connection of a design which is known in the art of laser welding. At the right-hand side of the marking head, there is a germanium window 202 which is transparent to infrared radiation of the type generated by the carbon dioxide laser emitter 203. It is protected by a structure 203 formed of a resilient material. The structure 203 is shown adjacent to a piece of window glass 204 of a vehicle in a position in which marking can commence.

The path of a laser beam is shown by a dotted line 205. The beam enters the marking head 105 at the bottom and is diverted by a fixed mirror 206. The diverted laser beam then impinges on a mirror 207 which is mounted on the rotatable shaft of a galvanometer 208. The angular position of the shaft of the galvanometer 208 may be varied in response to signals input to the galvanometer along a signal line 211. The laser beam is then deflected along a path 205 whose exact position will depend upon the angular position of the mirror 207. The deflected laser beam then impinges on a second rotatable mirror 209 which is mounted on the shaft of a second galvanometer 210. The second mirror 209 is mounted so that the normal to the mirror extends at right angles to the shaft of the galvanometer 210. Galvanometer 210 is mounted so that its shaft extends generally at right angles to the shaft of the galvanometer 208. The angular position of the mirror 209 may be varied by the galvanometer 210 in response to signals sent along line 212. Varying the position of the galvanometer 210 alters the position of the laser beam in a direction which is at right angles to the direction in which is it altered by the mirror 207. In this way, the final path of the laser beam 205 may be varied in two directions at right angles, allowing the laser beam to be swept through any pattern required, by giving appropriate signals to the galvanometers 208 and 210.

A pair of switches 214 are provided, mounted at the end of the structure 201. The switches 214 are configured such that, when they are depressed, a signal is given along lines 215, 216 to a control box 213.

The switches 214 are provided as a safety feature. In practice, a further switch 214 is provided (not shown), the three switches 214 lying in a pattern which extends over two dimensions. The control box 213 is configured such that it will only allow the laser to be fired if all of the switches 214 are depressed. This ensures that the laser may only be fired if the marking head 105 is in close contact with the surface of the window glass 204.

Finally, a trigger assembly control 106 is provided. The trigger assembly 106 is rigidly fixed with respect to the marking head 105 on a bracket. The trigger assembly 106 further comprises control buttons. Two laser fire buttons 217 are provided. Depressing both laser fire buttons 217 sends a signal along the control wire 218 to the control box 213. Control box 213, as noted above, will contain circuitry which will only permit the fire signals to be transmitted to the laser emitter 103 itself if all of the buttons 214 are depressed.

A further signal line 114 is provided extending from the control box 213. The signal wire 114 extends along the laser beam delivery means 104 and is connected, via a flexible connection, to the laser control means 103, as described further below. The wire 114 suitably comprises a bundle of wires for transmitting different signals, for example control signals for the galvanometers 210 and 208, and laser fire signals for operating the laser.

Figure 3:
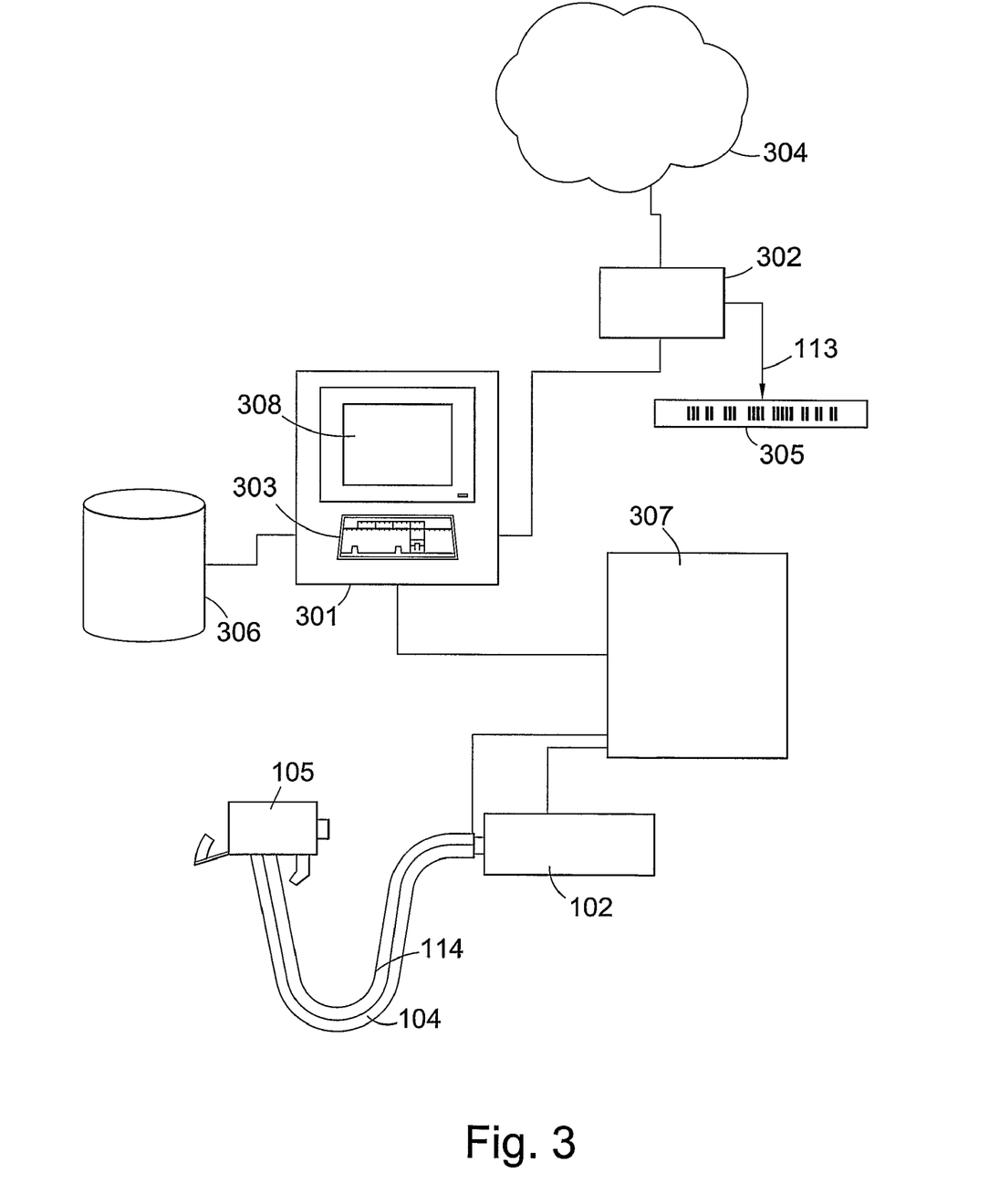
FIG. 3 is a schematic view of the controller for the laser marking apparatus of FIG. 1.

FIG. 3 is a schematic illustration of the laser controller 103. At the centre of the system is a processor unit 301. The processor unit 301 is configured to receive inputs from an input means 302 or keyboard 303. The input means 302 can receive information via a communications network 304, for example the public switch telephone network or the Internet. The connection may be established through the telecommunications socket 110. Input unit 302 can also receive signals from the barcode reader 113 reading a barcode for example 305.

The processor 301 is further connected to a data store 306. The processor 301 is further connected to the laser controller 307.

The input unit 302 or keyboard 303 is used to input to the processor 301 vehicle marking data.

The vehicle marking data will comprise a vehicle identification number (a number assigned to each vehicle by an international organisation), a description of the vehicle (for example type of vehicle and colour), a code to be marked on the vehicle and the number of windows of the vehicle to be marked. The processor 301 receives the vehicle marking data and stores it in the data store 306. When a vehicle is ready to be marked, an operator of the system will be able to input the vehicle identification number which will be marked on the vehicle. The operator may use the keyboard or a barcode reader in order to do this. When the processor 301 receives the vehicle identification or number of the vehicle to be marked, the processor checks in the data store 306 for a corresponding stored vehicle identification number. When the corresponding stored vehicle identification number is found, the processor displays the information on the screen 304 for confirmation by the operator. For example, the operator will be able to check that the description reported on the screen matches the vehicle in the vehicle station. The operator will be given the option of confirming that the vehicle has been correctly identified. Once this has been confirmed, the vehicle marking data is sent to the laser controller 307. The system is then ready for use.

The laser controller 307 is configured to produce three control signals which vary over time in a synchronised manner. The first signal controls whether the laser emitter 102 is on or off. The second signal is directed along control line 114 to the marking head 105 and controls the vertical position of the laser beam. The third signal is also transmitted along the control line 114 to the laser-marking head 105 and controls the horizontal position of the laser beam. The laser controller 307 will be configured to control the laser 102 and marking head 105 to produce the desired code for the vehicle. In order to mark the vehicle, the operator simply has to place a marking head 105 with the laser window adjacent the windows to be marked so that the buttons 114 are all depressed and press the laser fire button. This will send a signal to the laser controller 307 to commence the laser marking. The laser controller 307 will then send signals as described above to the laser 102 and to the galvanometers in the marking head 105 to produce the desired mark.

A laser controller and laser of this type is commercially available, for example from Rofin Sinar UK limited.

The operator will then mark as many windows of the vehicle as instructed on the screen 308. Once all windows have been marked, the operator may use, for example, the keyboard 303 to input a signal to the processor 301 to indicate that all windows have been marked. The processor is then configured to enter into the data store 306 that the vehicle has been marked. Preferably, the processor is configured to allow the operator to request additional marks for a particular vehicle, for example, for marking a sunroof.

Figure 4:
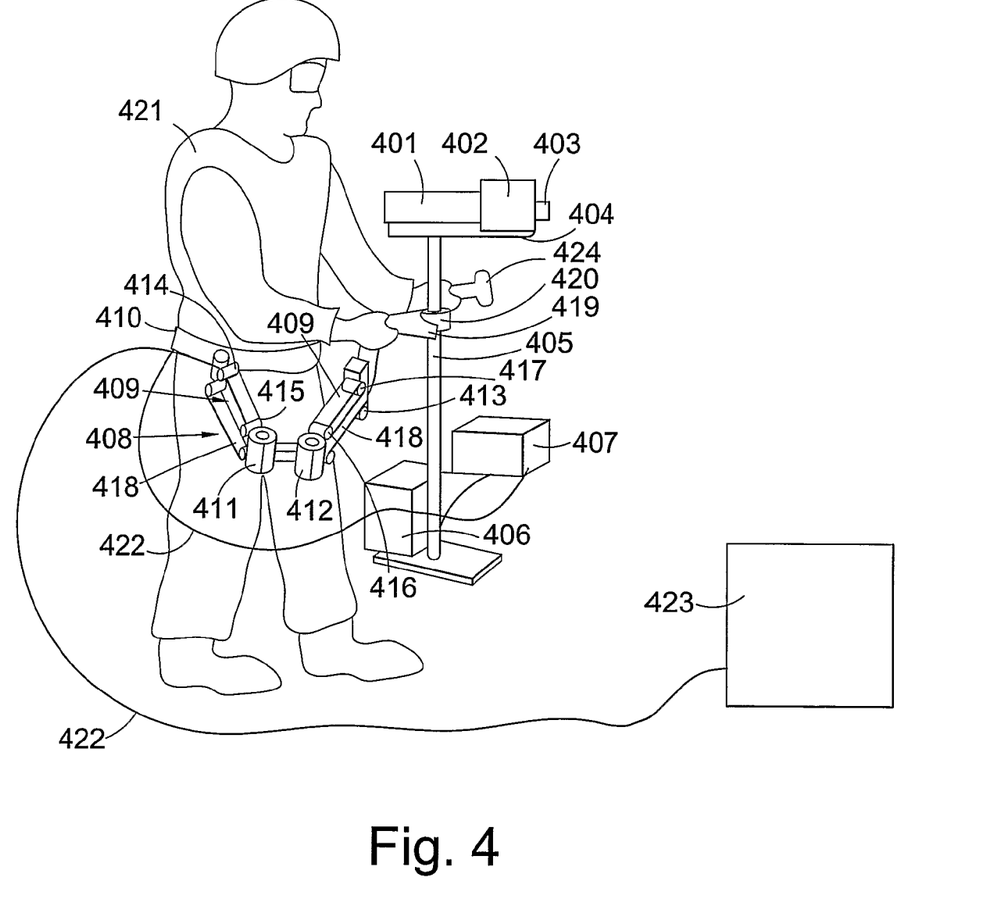
FIG. 4 is a sketch view of a second embodiment of laser marking apparatus according to the invention, in use.

FIG. 4 is a sketch view of an apparatus according to a second embodiment of the invention.

The second embodiment of the invention comprises a laser emitter 401 and a marking head 402 which are integrally mounted. Laser beam delivery means are provided between the laser emitter 401 and marking head 402. The laser beam delivery means comprises a simple rigid conduit (not shown).

The assembly of the laser emitter 401 and marking head 402 further comprises an aperture for 403 forcing against the glass of a vehicle to allow the glass to be marked.

The marking head 402 is similar in construction to the marking head 105 shown in FIG. 2 except that the input for the laser beam 104 in a different position. There is also no handle 107 and the trigger assembly 106 is mounted at a different position, as will be further explained below.

The assembly of the emitter 401 and marking head 402 are mounted on a structure which comprises the following elements.

The structure is based upon that of a STEADICAM®, which is a system for carrying a camera while isolating the camera from the jolts and jars of the operator's motion, allowing the camera to be presented in a constant orientation.

The present inventors have realised that this same kind of structure can be used to mount a laser emitter in such a way that the laser emitter is presented to the window glass of vehicle to be marked in a constant configuration. This allows good control of the orientation in which the laser is presented to the window above to be marked and accordingly good quality marks.

The apparatus is described in U.S. Pat. No. 4,017,168. The apparatus shown in FIG. 4 is based upon this apparatus and will be described further below.

A sleigh 404 is provided for mounting the laser emitter 401 and marking head 402. This corresponds to the sleigh for mounting the camera.

A sled pole 405 is provided for mounting the sleigh 404. Also mounted on the sled pole 405 is a data controller 406 and a transformer 407.

The whole weight of the sled pole 405 and the components mounted on it (laser emitter 401, marking head 402, data controller 406 and transformer 407) is carried by an articulated arm 408 in such a way that the operator does not have to carry any of the weight through their hands.

The articulated arm comprises two arm sections 409. Each arm section 409 comprises an upper arm link 409 which is rotatably mounted on pivots 410 and 411, 412, 413. These pivots allow the arms to be pivoted in the horizontal plane. Further, the arm sections are connected to pivots 414, 415, 416 and 417 which allow the arms to be pivoted in a vertical plane.

The weight of the camera assembly is prevented from pulling the arm sections down by lower arm casings which comprise a spring or other resilient means for resisting the weight of the sled pole and components. The lower arm casing 418, 419 is in each case constructed as a parallelogram with the respective upper arm sink 409. In this way, the entire arm assembly will not move under the weight of the sled pole and the components alone, which can accordingly be moved by the operator exerting a light force on the assembly. The parallelogram arrangement allows the articulated arm to keep the end of the arm in a fixed orientation.

A handle 419 is provided is held by the operator for moving the sled pole and components up and down. The handle comprises a gimbal link 420 so that the sled pole is held by the gimbal and angular movement with respect to the gimbal is permitted. The handle further comprises laser fire buttons for operating the laser.

The weight of the articulated arm and the sled pole assembly is transferred through the belt 410 to a vest or brace 421 which is worn by the user so that it fits tightly and allows the entire weight to be transferred in the manner which is relatively comfortable and rigid to the user's body.

The laser emitter, marking head 402, transformer 407 and data set controller 406 are displaced away from the centre of mass of the sled pole and components so that the moment of inertia of the entire assembly is quite high without being unnecessarily heavy.

In use, as the operator moves around the factory floor, any jolts and jars caused by the operator's movement are effectively taken up by the movement of the articulated arm without transferring to the laser assembly. Tilting and other attitude alterations are resisted by the high moment of inertia of the sled pole assembly around the gimbal.

Also shown in FIG. 4 is a power cable 422 for delivering power to the transformer 407 from a central power source 423. Data may be also sent to the data controller 406 via the cable 422 from the central unit 423. A barcode reader 424 is shown for supplying data identifying the vehicle as marked.

The weight of the laser emitter and marking head is the same as in FIGS. 2 and 3.

The system for the control of the operation of the laser marking apparatus shown in FIG. 3 is substantially the same as shown in FIG. 3 above, using the same components 301, 302, 303, 304, 305, 306, 307 and 308. The laser controller 307 corresponds to the central unit 423 shown in FIG. 4.

The apparatus shown in FIG. 4 may further include optional components, for example, a monitor for supplying information to the user relating to the vehicles to be marked, or automated adjusters for further controlling the attitude of the laser marking head.

The power supply for either embodiment of the present invention may comprise a battery pack, comprising a set of rechargeable electrical storage cells. The pack further comprises an inverter for converting the 24 V DC supply to a 230 V AC supply. For example, a Studer 51 series (reference 2324) inverter may be used.

The present invention has been described above by way of example only and modifications can be made within the invention, which extends to equivalents of the features described. The invention consists in any individual features described or implicit herein or shown or implicit in the drawings or any combination of any such features or any generalisation of any such features or combination.

The invention claimed is:

1. A laser marking system for marking a part of a vehicle by disrupting the material of the interior or surface of the part of the vehicle, the system comprising:
   a marking head comprising means for directing a laser beam to define a pattern,
   a laser emitter, and
   laser beam delivery means for delivering the laser beam from the laser emitter to the marking head, wherein the marking head and laser emitter are movable and both configured to be carried by a person, and wherein the emitter is carried on a personal load carrying system which is rigidly mountable on a user's body, the marking head being mounted on a support arm which allows the marking head to be moved with respect to the personal load carrying system while transferring the weight of the marking head to the personal load carrying system.

2. A laser marking system according to claim 1, wherein the emitter and marking head are mounted on the support arm.

3. A laser marking system according to claim 1, wherein at least the marking head comprises a handle.

4. A laser marking system according to claim 1, wherein the laser beam delivery means permits the marking head to be displaced with respect to the laser emitter in at least two dimensions and preferably in at least three dimensions.

5. A laser marking system according to claim 4, wherein the laser beam delivery means permits the direction in which the marking head faces to be moved with respect to the laser emitter in two angular dimensions.

6. A laser marking system according to claim 1, wherein the laser emitter is a carbon dioxide laser.

7. The laser marking system according to claim 6, wherein the carbon dioxide laser is a pulsed carbon dioxide laser.

8. The laser marking system according to claim 7, wherein the carbon dioxide laser is pulsed by a Q-switch.

9. A laser marking system according to claim 1, wherein the weight of the marking head does not exceed 5 kg, being preferably less than 3 kg and preferably less than 2 kg.

10. A laser marking system according to claim 1, wherein the duty ratio of the laser beam is in the range 20-60%, preferably 30-50%, most preferably 35-45%.

11. A laser marking system according to claim 1, wherein the scanning speed of the laser beam across the object to be marked is in the range 2000-8000, preferably 3000-6000, most preferably 4000-5000 mm/s.

12. A laser marking system according to claim 1, wherein the power of the laser beam is in the range 5-20watts, more preferably 10-15 watts.

13. A method of marking a part of a vehicle by disrupting the material of the interior or surface of the part of the vehicle using a laser, comprising using the laser marking system of claim 1.

* * * * *